United States Patent
Deming et al.

(10) Patent No.: US 9,153,211 B1
(45) Date of Patent: Oct. 6, 2015

(54) METHOD AND SYSTEM FOR TRACKING ACCESSES TO VIRTUAL ADDRESSES IN GRAPHICS CONTEXTS

(75) Inventors: James L. Deming, Madison, AL (US); David B. Glasco, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 1719 days.

(21) Appl. No.: 11/949,731

(22) Filed: Dec. 3, 2007

(51) Int. Cl.
| | |
|---|---|
| G06F 12/00 | (2006.01) |
| G09G 5/39 | (2006.01) |
| G06T 1/60 | (2006.01) |
| G09G 5/395 | (2006.01) |
| G09G 5/393 | (2006.01) |

(52) U.S. Cl.
CPC ... *G09G 5/39* (2013.01); *G06T 1/60* (2013.01); *G09G 5/393* (2013.01); *G09G 5/395* (2013.01); *G09G 2360/12* (2013.01)

(58) Field of Classification Search
CPC ......... G09G 5/39; G09G 5/393; G09G 5/395; G09G 2360/12; G06T 1/60
USPC .......... 345/522, 532, 620, 564; 711/145, 146, 711/141, 144, 133, 206, 207, 119, 228; 714/758, 727, 52; 713/500
See application file for complete search history.

(56) References Cited

U.S. PATENT DOCUMENTS

| | | | |
|---|---|---|---|
| 5,305,444 A * | 4/1994 | Becker et al. ................. | 711/207 |
| 5,315,696 A * | 5/1994 | Case et al. .................... | 345/522 |
| 5,321,810 A * | 6/1994 | Case et al. .................... | 345/562 |
| 5,640,591 A * | 6/1997 | Rosenthal et al. ............... | 710/3 |
| 5,759,044 A * | 6/1998 | Redmond .................. | 434/307 R |
| 5,956,756 A * | 9/1999 | Khalidi et al. ................ | 711/207 |
| 6,081,854 A * | 6/2000 | Priem et al. .................... | 710/37 |
| 6,496,909 B1 * | 12/2002 | Schimmel .................... | 711/163 |
| 7,278,008 B1 * | 10/2007 | Case et al. .................... | 711/209 |
| 7,296,139 B1 * | 11/2007 | Case et al. .................... | 711/209 |
| 7,558,940 B2 * | 7/2009 | Hancock ...................... | 711/206 |
| 2003/0208481 A1 * | 11/2003 | Neumann ....................... | 707/3 |
| 2004/0130552 A1 * | 7/2004 | Duluk et al. .................. | 345/506 |
| 2004/0221093 A1 * | 11/2004 | Beckert et al. ................. | 711/103 |
| 2004/0221142 A1 * | 11/2004 | Beckert et al. ................. | 712/244 |
| 2005/0210179 A1 * | 9/2005 | Walmsley et al. ................ | 711/3 |
| 2006/0230223 A1 * | 10/2006 | Kruger et al. ...................... | 711/6 |
| 2006/0236063 A1 * | 10/2006 | Hausauer et al. ............. | 711/170 |
| 2006/0259732 A1 * | 11/2006 | Traut et al. .................... | 711/173 |
| 2007/0073996 A1 * | 3/2007 | Kruger et al. ................. | 711/207 |
| 2007/0288721 A1 * | 12/2007 | Kruger et al. ................. | 711/207 |
| 2008/0162795 A1 * | 7/2008 | Hsieh et al. ................... | 711/103 |

* cited by examiner

*Primary Examiner* — Abderrahim Merouan
(74) *Attorney, Agent, or Firm* — Artegis Law Group, LLP

(57) ABSTRACT

A method and system for tracking accesses to virtual addresses are disclosed. Specifically, one embodiment of the present invention sets forth a method, which includes the steps of receiving a virtual address from a client requesting to access memory in a graphics context, updating access state information corresponding to a virtual page associated with the graphics context in which the virtual address resides, after the virtual address successfully maps to a physical memory location, and determining whether to evict a physical page associated with the graphics context based on the access state information.

22 Claims, 9 Drawing Sheets

METHOD AND SYSTEM FOR TRACKING ACCESSES TO VIRTUAL ADDRESSES IN GRAPHICS CONTEXTS

BACKGROUND OF THE INVENTION

1. Field of the Invention

The present invention generally relates to virtual memory management, and more particularly to a method and system for tracking accesses to virtual addresses in graphics contexts.

2. Description of the Related Art

Unless otherwise indicated herein, the approaches described in this section are not prior art to the claims in this application and are not admitted to be prior art by inclusion in this section.

Modern graphics processing units (GPUs) incorporate high speed processing units, such as shader engines and texture units, which are capable of performing multiple tasks on significant amounts of data in parallel. To access and operate on such data, some virtual memory management schemes have been developed for the GPUs to handle extensive memory accesses.

Traditionally, virtual memory management was implemented for central processing units (CPUs). With virtual memory management, a process can indirectly access physical pages, which store data in a physical memory, via "virtual" addresses. To effectively access the physical page, one memory management mechanism keeps and updates translations from virtual addresses, more precisely "virtual" page numbers derived from the virtual addresses, to physical addresses that point to physical pages in the physical memory. If a physical page corresponding to a virtual address does not currently reside in the physical memory, then the operating system performs the required operations to load the missing page from an auxiliary storage device (such as a hard disk) without needing to know which process requests to access the physical page. Though the aforementioned virtual memory mechanism has been extensively used in CPUs, it is not directly applicable to address some specific GPU's needs.

FIG. 1 illustrates one prior art virtual memory management approach for a GPU. Each task or process performed by the GPU corresponds to a graphics context. "Graphics context" as used herein means all the states, including memory states, needed for the GPU to perform one process. In this prior art implementation, "surface residency" model is adopted, which requires the physical presence of an entire surface, such as the texture surface 108, in the physical memory 106 before a graphics context is executed. With reference to FIG. 1, suppose the list of graphics contexts run by the GPU includes a first graphics context C1 and a second graphics context C2. In the first graphics context C1, for example, a texture mapping operation is applied to a first texture TEXTURE#1, while in the second graphics context C2, another texture mapping operation is applied to a second texture TEXTURE#2. The first graphics context C1 is further associated with a virtual memory space 102 in which certain virtual addresses are allocated for TEXTURE#1. Similarly, the second graphics context C2 is also associated with a virtual memory space 104 in which certain virtual addresses are allocated for TEXTURE#2. To access TEXTURE#1 or TEXTURE#2, the entire texture surface needs to be resident in the physical memory 106. If the surface is not resident in the physical memory, as shown for TEXTURE#2, a surface fault is generated, causing an interrupt to be generated. Then, the driver program along with the operating system usually take over and perform the necessary operations to swap in the missing surface.

The aforementioned surface fault model has a number of disadvantages. First, because it involves the residency of an entire surface, any time a surface fault occurs, the entire surface needs to be swapped in, which may cause undesirable thrashing due to the constant transferring of surfaces between the physical memory 106 and the auxiliary storage. Moreover, suppose only a particular portion of a texture is requested, such as portion 110. Under the surface fault model, memory locations sufficient to hold the entire texture surface in the physical memory 106 are still required to be allocated. Furthermore, referring again back to FIG. 1, with the concurrently operating graphics contexts C1 and C2, implementing a replacement policy for the physical memory 106 on the coarse granularity of a surface (e.g., which surface can be evicted) is likely problematic and inefficient.

As the foregoing illustrates, what is needed in the art is thus a mechanism that can track accesses to virtual addresses in graphics contexts at a finer granularity and address at least the problems set forth above.

SUMMARY OF THE INVENTION

A method and system for tracking accesses to virtual addresses are disclosed. Specifically, one embodiment of the present invention sets forth a method, which includes the steps of receiving a virtual address from a client requesting to access memory in a graphics context, updating access state information corresponding to a virtual page associated with the graphics context in which the virtual address resides, after the virtual address successfully maps to a physical memory location, and determining whether to evict a physical page associated with the graphics context based on the access state information.

At least one advantage of the present invention disclosed herein is the ability to track virtual addresses that are recently accessed in a graphics context at a finer granularity than conventional approaches, so that unnecessary evictions of physical pages associated with the recently accessed virtual addresses can be avoided in paging operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
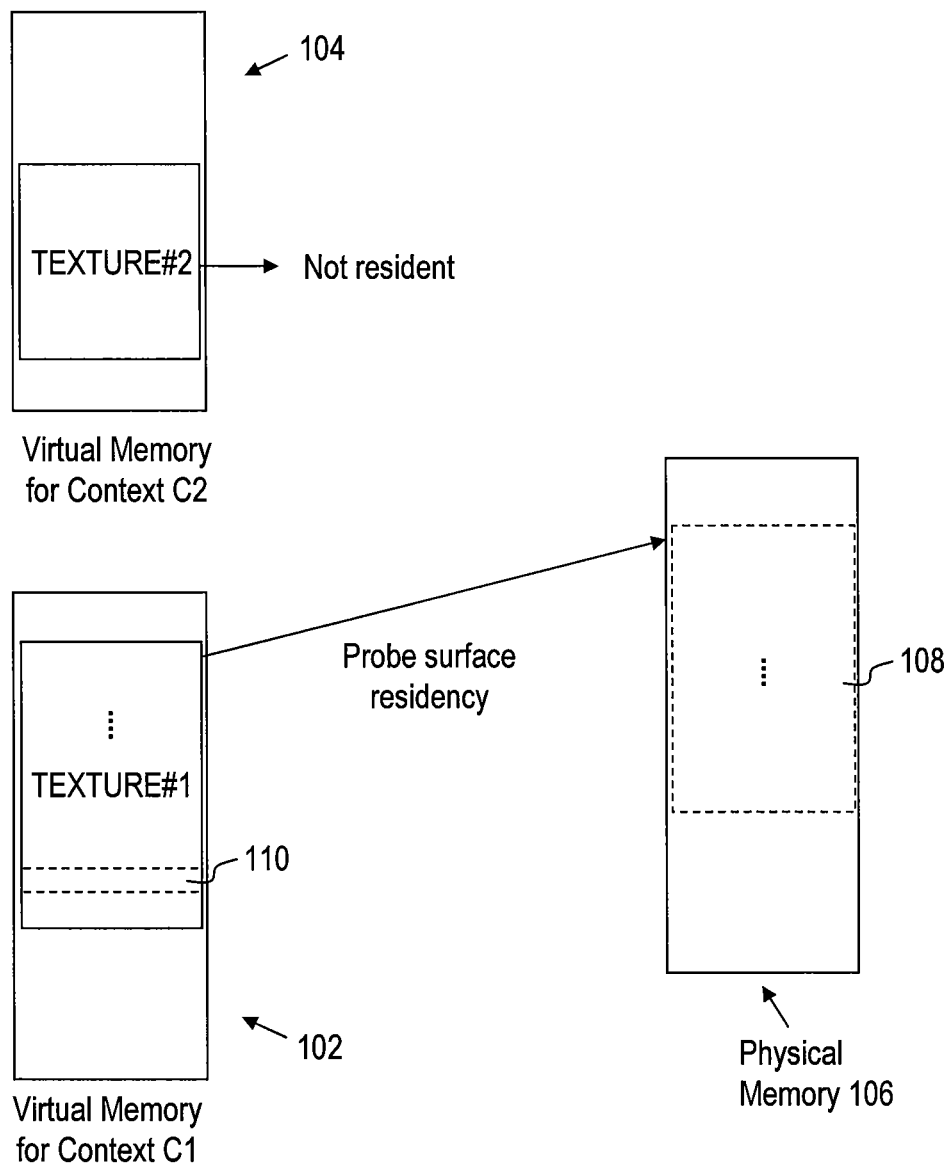
FIG. 1 illustrates a prior art virtual memory management approach for a GPU.
Figure 2A:
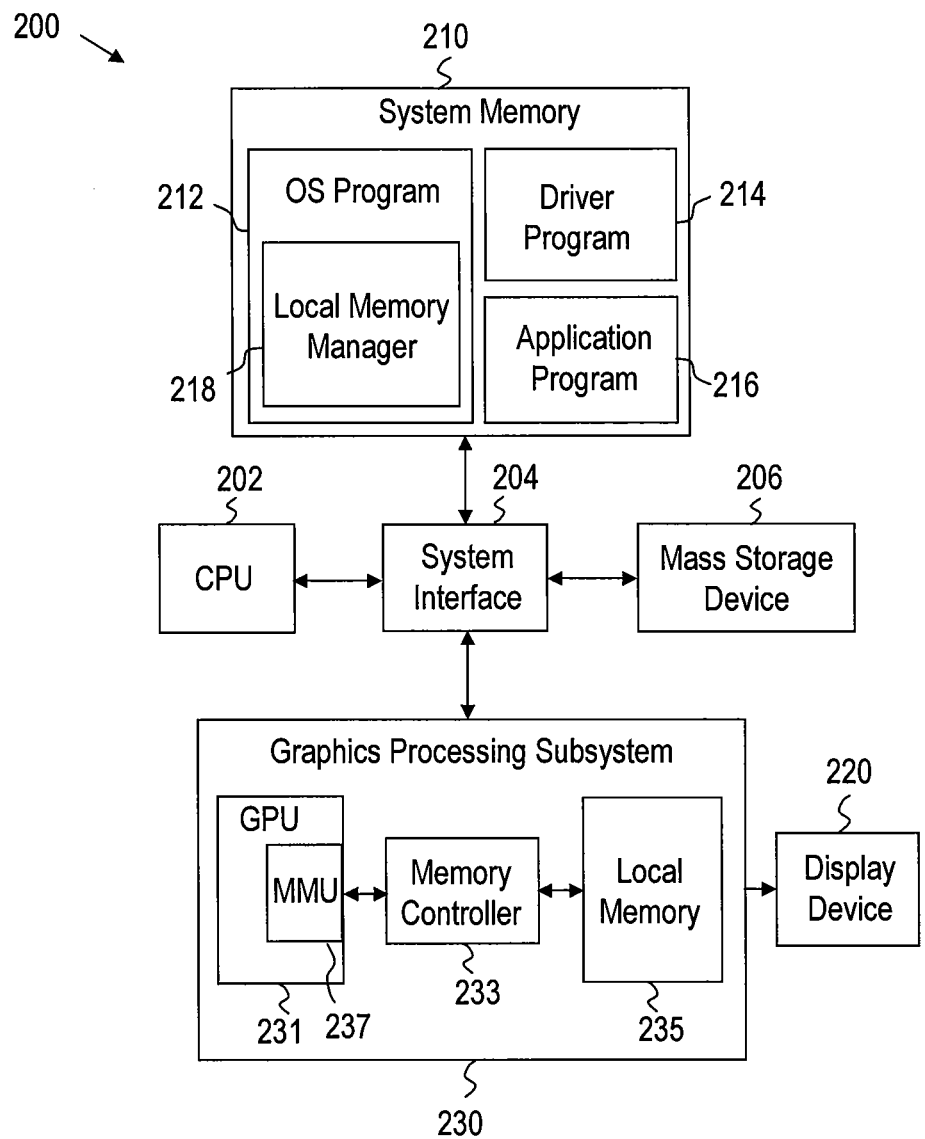
FIG. 2A is a conceptual diagram of a computing device configured to implement one or more aspects of the present invention.

FIG. 2A is a conceptual diagram of a computing device 200 configured to implement one or more aspects of the present invention. Computing device 200 includes a central processing unit (CPU) 202, a system interface 204, a mass storage device 206, a system memory 210, a graphics processing subsystem 230 and a display device 220. CPU 202 connects to system memory 210, mass storage device 206, and graphics processing subsystem 230. The system interface 204 may include a system bus, a memory controller, Accelerated Graphics Port (AGP) and other necessary interfaces to establish communication links between the CPU 202 and the other illustrated components of the computing device 200. CPU 202 executes programming instructions stored in system memory 210, operates on data stored in system memory 210 and/or mass storage device 206, and communicates with graphics processing subsystem 230 through the system interface 220. In alternate embodiments, CPU 202, graphics processing subsystem 230, system interface 204 or any combination thereof, may be integrated into a single processing unit. Further, the functionality of the graphics processing subsystem 230 may be included in a chipset or in some other type of special purpose processing unit or co-processor. System memory 210 typically includes dynamic random access memory (DRAM) configured to connect to CPU 202 via the system interface 204 (as shown), or alternatively via a direct link.

Graphics processing subsystem 230 includes a graphics processing unit (GPU) 231, a memory controller 233, and local memory 235. The GPU 231 receives instructions transmitted by CPU 202 and performs multiple tasks on graphics data to render images stored in local memory 235. Local memory 235 stores graphics data and information useful for generating images for presentation on display device 220. Graphics data may be written into and/or read from local memory 235 via memory controller 233. A memory management unit (MMU) 237 associated with GPU 231 is configured to handle memory access requests issued by the GPU 231. Functions of MMU 237 may include the translation of virtual addresses to physical addresses, memory protection, and cache control. Display device 220 is an output device capable of emitting a visual image corresponding to an input data signal. Display device 220 may be any types of display monitors such as liquid crystal displays, cathode-ray-tube displays, plasma displays, or any suitable display systems.

System memory 210 contains an operating system (OS) program 212, driver program 214, and application program 216. OS program 212 includes a local memory manager 218 that interacts with driver program 214 to operate on GPU 231 for handling virtual memory management. Application program 216 and/or OS program 212 may invoke one or more instances of high-level program codes that are designed to operate on graphics processing subsystem 230. These high-level programs may be translated into executable program objects by a compiler or assembler included in driver program 214 or alternatively by an offline compiler or assembler operating on computing device 200. One application program 216 may be, for example, a video game program that generates graphics data and invokes appropriate rendering functions of GPU 231 to transform the graphics data to pixel data. Another exemplary application program 216 may generate pixel data and provide the pixel data to graphics processing subsystem 230 for presentation on display device 220. In any event, each instance of application program 216 that generates pixel and/or processes graphics data is executed on GPU 231 in a corresponding graphics context. In addition, OS program 212 may also generate pixel and/or graphics data to be processed by graphics processing subsystem 230 in graphics contexts.

Figure 2B:
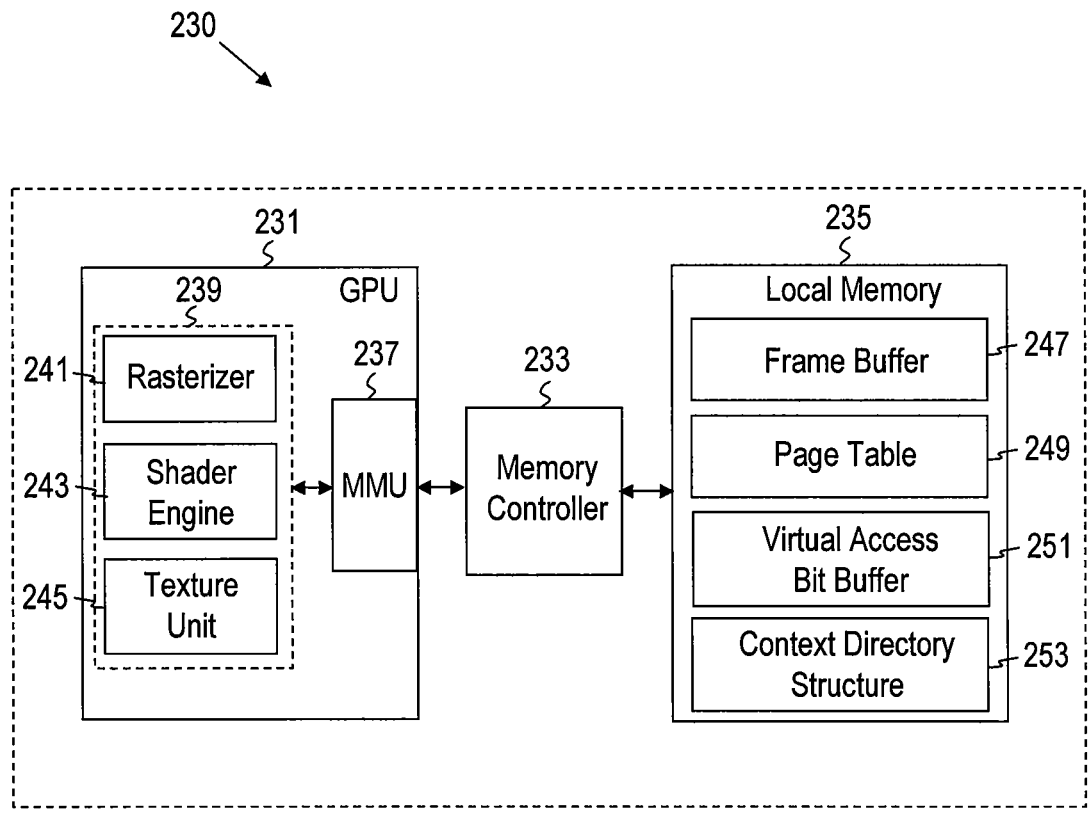
FIG. 2B is a detailed illustration of the graphics processing subsystem shown in FIG. 2A configured to implement a memory management system that tracks accesses to virtual addresses, according to one embodiment of the invention.

FIG. 2B is a detailed illustration of the graphics processing subsystem 230 shown in FIG. 2A configured to implement a memory management system that tracks accesses to virtual addresses, according to one embodiment of the invention. To process graphics data, GPU 231 includes a plurality of processing units, such as rasterizer 241, shader engine 243, and texture unit 245, each of which is configured to perform different operations on graphics data. Local memory 235 includes frame buffer 247, page table 249, virtual access bit buffer 251, and context directory structure 253. In alternate embodiments, page table 249, virtual access bit buffer 251 and context directory structure 253, or any combinations thereof, may be stored in another location, such as system memory 210 or even mass storage device 206 of FIG. 2A. Context directory structure 253 is a data structure that contains information for implementing virtual memory management for each graphics context executed on GPU 231. In particular, for each graphics context, context directory structure 253 contains a pointer to a set of page tables 249, virtual address limits that define the boundaries of the virtual address space allocated for the graphics context, and information defining virtual access bit buffer 251 and its configuration state. Page table 249, which may be created by the OS program 212, contains information for translating virtual addresses to physical addresses. The virtual access bit buffer 251 is defined to track the access state of virtual addresses referenced in the graphics context. The configuration of the virtual access bit buffer 251 and its use in graphics contexts is detailed below and illustrated in FIGS. 2C through 2E.

Figure 2C:
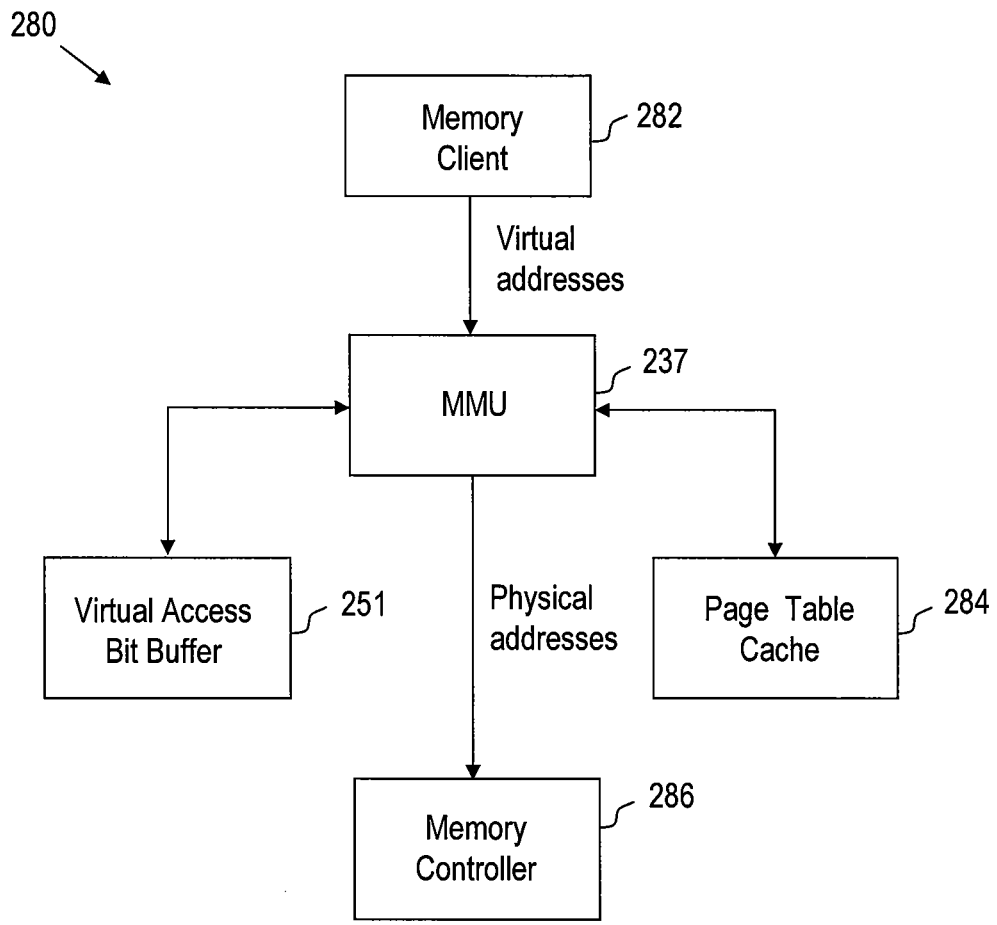
FIG. 2C is a conceptual diagram of a virtual memory management system, according to one embodiment of the present invention.

Specifically, in conjunction with FIGS. 2A and 2B, FIGS. 2C, 2D, and 2E illustrate an implementation of virtual memory management system 280 in graphics contexts that tracks accesses to virtual addresses, according to one embodiment of the invention. As shown in FIG. 2C, an implementation of a virtual memory management system 280 includes a memory client 282, MMU 237, a page table cache 284, virtual access bit buffer 251, and a memory controller 286. The memory client 282 typically is GPU 231, and more specifically can be any processing resource in GPU 231 issuing requests to access memory while running in a graphics context, such as rasterizer 241, shader engine 243, or texture unit 245. MMU 237 is configured to handle memory access requests issued by the memory client 282. In particular, MMU 237 performs address translations using page table cache 284, updates and reads virtual access bit buffer 251, and sends requests to memory controller 286 for accessing mapped physical addresses. Memory controller 286 interfaces with the memory location designated by the physical address. In one implementation, memory controller 233 interfaces with local memory 235. Alternatively, a memory controller (not shown) accesses system memory 210 via system interface 204 shown in FIG. 2A.

Figure 2D:
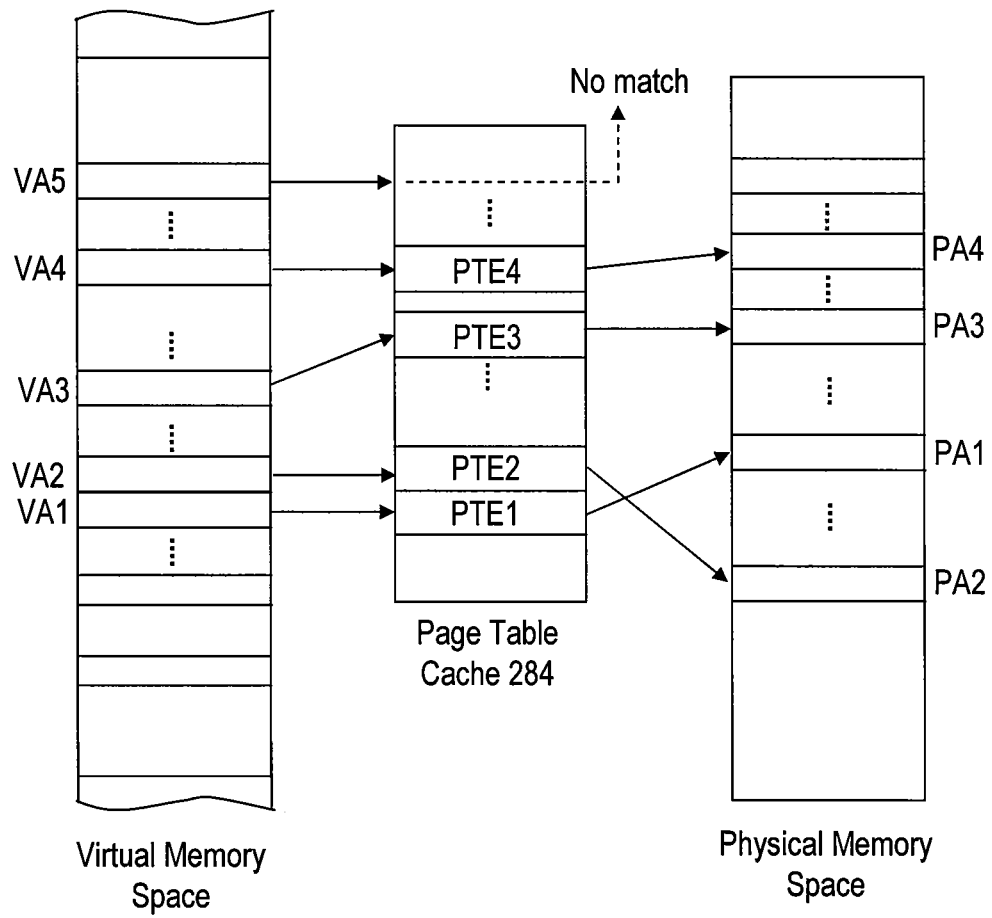
FIG. 2D is a schematic diagram illustrating an address translation process associated with a graphics context, according to one embodiment of the present invention.

For each graphics context, as shown in FIG. 2D, page table cache 284 includes a plurality of page table entries (PTEs), each of which stores mapping information between a virtual page and a physical page. MMU 237 extracts a virtual page number from each virtual address (e.g., VA1, VA2, VA3, VA4, and VA5) received from memory client 282 and then accesses the page table cache 284 to determine whether the virtual page number matches one of the PTEs. If there is a match (e.g., PTE1, PTE2, PTE3, and PTE4), then MMU 237 sends a request to memory controller 286 to access the physical address (e.g., PA1, PA2, PA3, and PA4) derived from the physical page number contained in the matched PTE. The physical address may point to local memory 235 or system memory 210. If a page miss occurs because no match is found in page table cache 284, then MMU 237 proceeds to search page table 249 in local memory 235 as shown in FIG. 2B for a possible match. If a match is identified in page table 249, then MMU 237 requests to access the physical address via memory controller 286 and updates page table cache 284 to capture this matched page number from page table 249. If no match is found in either page table cache 284 or page table 249 (e.g., VA5 in the example of FIG. 2D), MMU 237 causes the issuance of a page fault, which signals the occurrence of a missing page that needs to be swapped into the physical memory space from an auxiliary memory, such as mass storage device 206 of FIG. 2A. To resolve the page fault, local memory manager 218 determines the needed operations to load the missing page, including possibly evicting least recently used pages from the physical memory space.

Figure 2E:
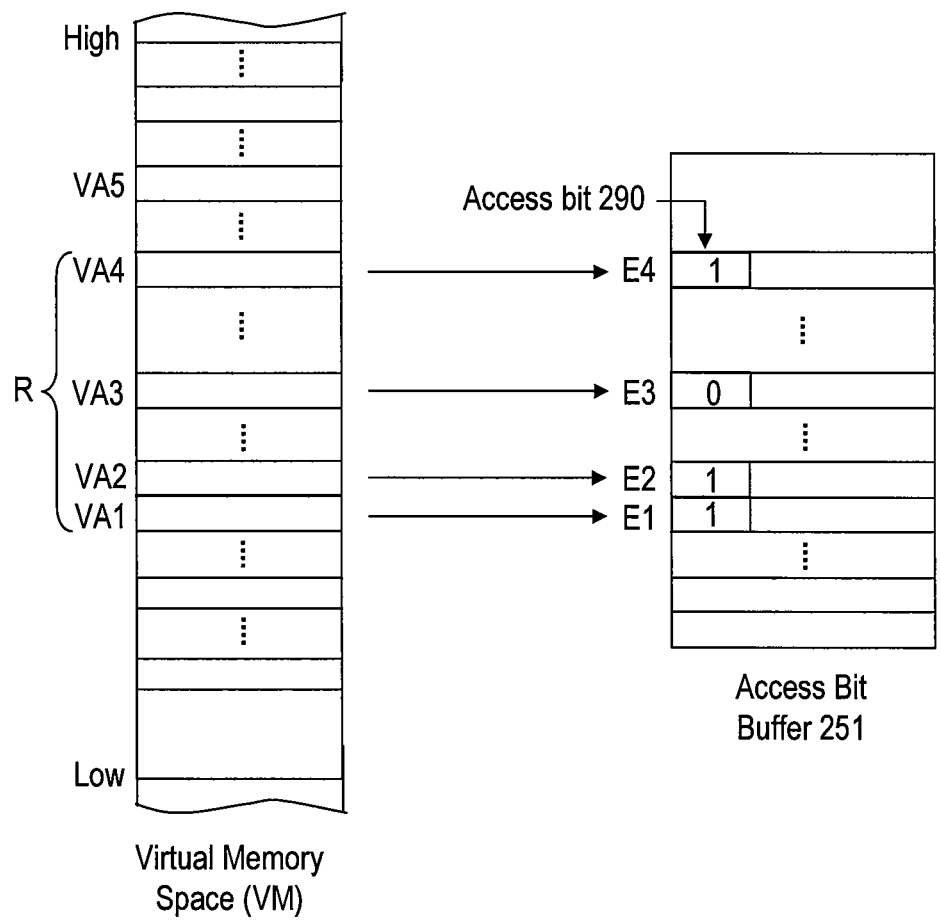
FIG. 2E is a conceptual diagram illustrating of the use of a virtual access bit buffer associated with a graphics context, according to one embodiment of the present invention.
Figure 3A:
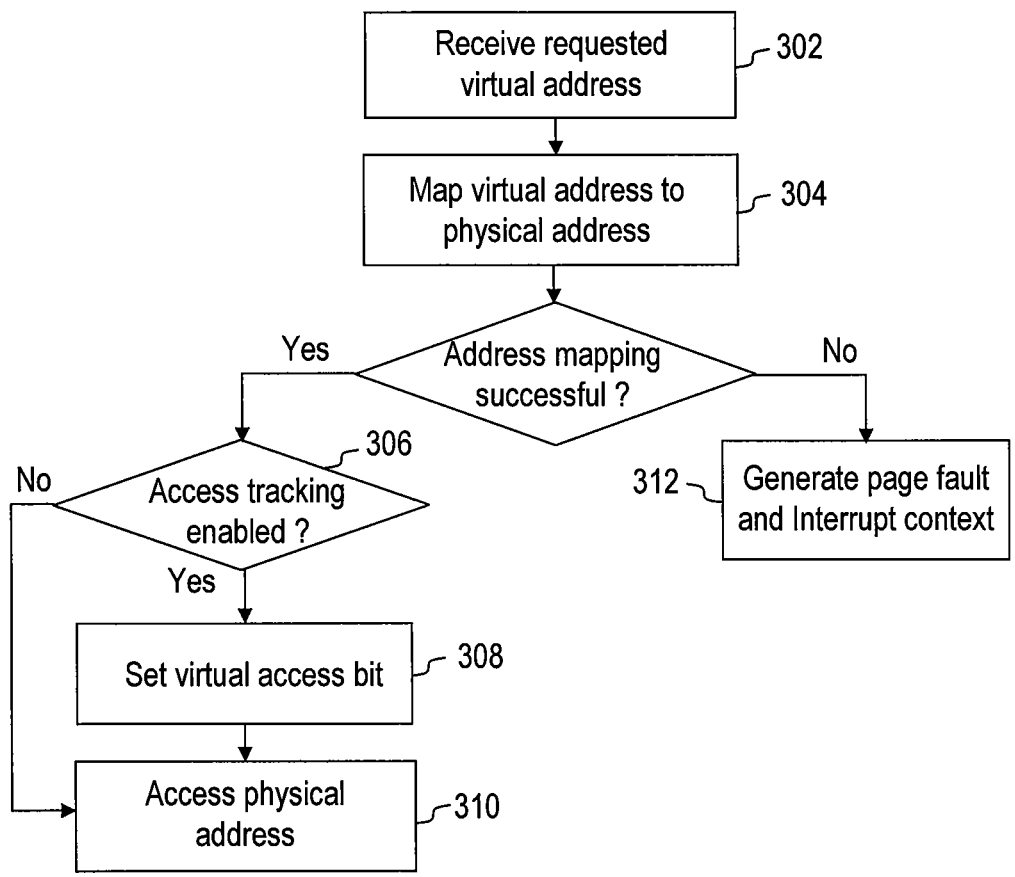
FIG. 3A is a flowchart illustrating the method steps implemented by a memory management unit for configuring a virtual access bit buffer in a graphics context, according to one embodiment of the present invention.
Figure 3B:
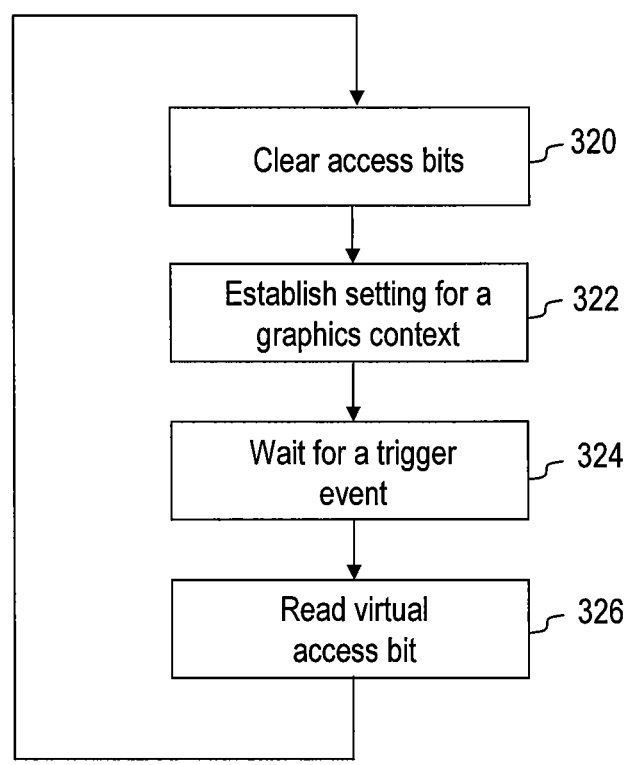
FIG. 3B is a flowchart illustrating how virtual access bits are used in a graphics context, according to one embodiment of the present invention.

To determine which page may be a candidate for eviction, virtual access bit buffer 251 is used to track whether a virtual address has been recently accessed in a graphics context. As shown in FIG. 2E, virtual access bit buffer 251 defines a virtual access bit 290 for each virtual page in the virtual memory space that is allocated for a particular graphics context. In addition, how a virtual address in the graphics context is tracked is determined by a virtual access tracking setting in context directory structure 253 shown in FIG. 2B. For example, in conjunction with FIG. 2E, one virtual access tracking setting is the inclusive mode, where the virtual addresses within the selected address range R are tracked. To avoid unnecessarily obscure the discussions of the present invention, suppose each of the virtual addresses V1, V2, V3, V4, and V5 corresponds to a distinct virtual page. Suppose further that each of the virtual access bits E1, E2, E3, and E4 corresponds to the virtual pages for V1, V2, V3, and V4, respectively. Thus, if accesses are made to the virtual addresses within this address range R, such as VA1, VA2, and VA4, then their respective virtual access bit sets, e.g. E1, E2 and E4, are set to 1. On the other hand, if no accesses are made to a particular virtual address within the address range R, such as VA3, then the corresponding virtual access bit, such as E3, is set to 0. Alternatively, another virtual access tracking setting is the exclusive mode, where only accesses made to virtual addresses out of the address range R are tracked. In yet other alternative embodiments, this virtual access tracking setting applies either globally for all graphics contexts or selectively for predetermined graphics contexts by using specific enable bits defined in context directory structure 253.

In conjunction with FIGS. 2C through 2E, FIG. 3A is a flowchart illustrating the method steps implemented by MMU 237 for configuring a virtual access bit buffer in a graphics context, according to one embodiment of the present invention. In an initial step 302, MMU 237 shown in FIG. 2C receives a virtual address from memory client 282 conveying a memory access request associated with the graphics context. In step 304, MMU 237 translates the virtual address to a physical address. One approach of carrying out such translations using a page table cache and a page table is detailed above. If the virtual address successfully maps to a physical address, in step 306, MMU 237 determines whether virtual access tracking is enabled before updating the corresponding virtual access bit 290 in step 308. Various virtual access tracking settings are described above. In step 310, MMU 237 sends the mapped physical address to the memory controller 286 to access the physical memory.

In case the virtual address does not successfully map to a physical address, in step 312, MMU 237 causes the issuance of a page fault and also an interrupt to the graphics context. To resolve the page fault, as previously described above in conjunction with FIGS. 2A and 2D, local memory manager 218 and driver program 214 in one implementation take over and perform the appropriate operations to load the missing page.

In conjunction with FIGS. 2A, 2B, and 2E, FIG. 3B is a flowchart illustrating how virtual access bits are used in a graphics context, according to one embodiment of the present invention. Multiple graphics contexts may be scheduled to concurrently run on GPU 231 under the supervision of OS program 212 and driver program 214. At the beginning of each time slice dedicated to each graphics context, in initial step 320, the virtual access bits 290 associated with the graphics context are cleared. To start the graphics context, in step 322, the OS program 212 and driver program 214 operate to establish the necessary settings for the scheduled graphics context to run on GPU 231. In particular, context directory structure 253 associated with this graphics context is accessed to define the location of page table 249, the virtual address limits of the allocated virtual memory space, and the virtual access tracking settings for virtual access bits 290. In step 324, as GPU 231 processes the graphics context, OS program 212 waits for a trigger event that signals a read or write request associated with virtual access bits 290. As described above, this trigger event can be the result of a request to swap in a missing page, which may require determining which physical page should be evicted. Consequently, in step 326, local memory manager 218 of OS program 212 reads virtual access bits 290 to determine the access state of the virtual addresses that are tracked in the graphics context. If virtual access bit 290 corresponding to a virtual page indicates that the virtual page is not accessed, then the physical page corresponding to this virtual page becomes a candidate for eviction. It should be noted that each virtual address may correspond to physical pages that reside in non-contiguous memory locations, such as system memory 210 and local memory 235. Regardless of their physical memory locations, in one implementation, any physical page that is not recently accessed in the graphics context can be considered as a candidate for eviction. In alternate embodiments, the reading and updating of the virtual access bits 290 can take place at a predetermined time in the graphics context to identify infrequently accessed virtual pages regularly. Based on the access state information associated with the virtual addresses, unnecessary evictions of certain physical pages associated with the accessed virtual addresses can be avoided in paging operations.

Figure 4:
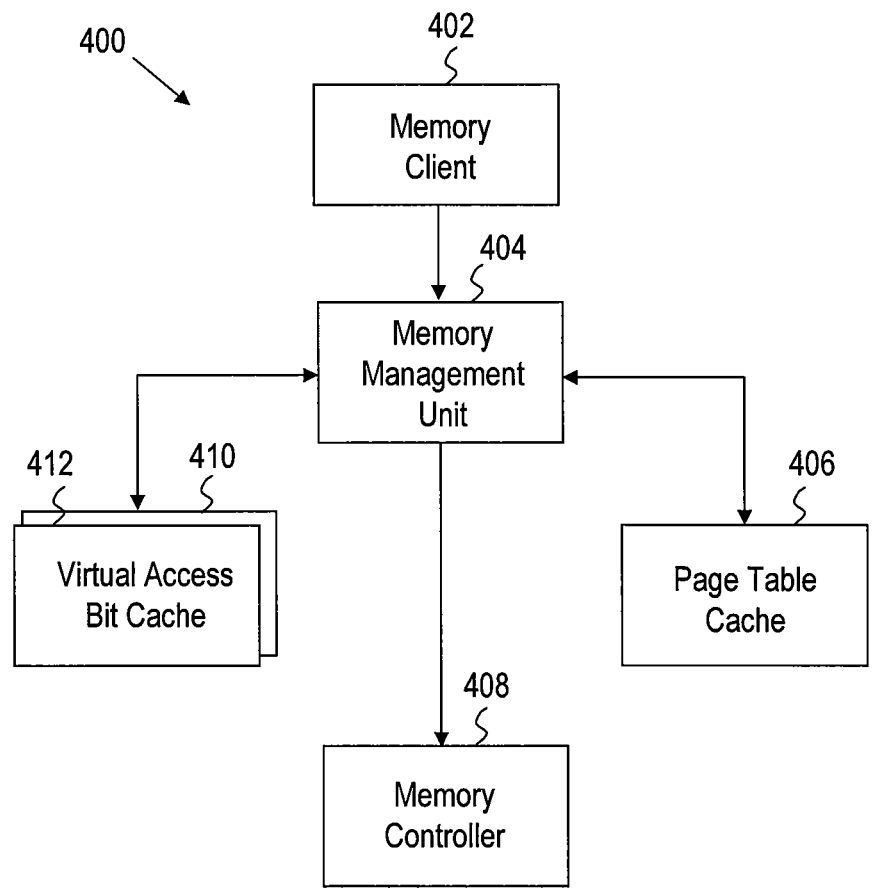
FIG. 4 illustrates a virtual memory management system that tracks accesses to virtual addresses, according to an alternative embodiment of the present invention.

FIG. 4 illustrates a virtual memory management system 400 that tracks accesses to virtual addresses, according to an alternative embodiment of the present invention. Like virtual memory management system 280 shown in FIG. 2C, virtual memory management system 400 shown in FIG. 4 includes a memory client 402, MMU 404, page table cache 406, memory controller 408, and virtual access bit buffer 410. In addition, virtual memory management system 400 also includes virtual access bit cache 412 that duplicates the content of virtual access bit buffer 410. Virtual access bit cache 412 can use the physical address of each virtual access bit as the cache tag. With the use of virtual access bit cache 412, faster access to the virtual access bits can be obtained, and multiple graphics context can use the same virtual access bit buffer 410.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

We claim:

1. A computer-implemented method for tracking accesses to virtual addresses, the method comprising:
   Initializing a virtual access bit buffer that includes a plurality of virtual access bits by clearing each virtual access bit in the plurality of virtual access bits, wherein the virtual access bit buffer includes a different virtual access bit for each virtual page residing within a virtual memory space allocated for a graphics context;
   receiving a virtual address from a client conveying a memory access request associated with the graphics context;
   matching a virtual page associated with the virtual address with a page table entry;
   deriving a physical address from a physical page contained in the page table entry;
   determining that virtual access tracking is enabled; and
   setting a virtual access bit located in the virtual access bit buffer, wherein the virtual access bit corresponds to the virtual page.

2. The method of claim 1, wherein the contents of the virtual bit buffer are duplicated in a virtual access bit cache.

3. The method of claim 2, wherein a physical address associated with the virtual access bit is used as a tag in the virtual access bit cache.

4. The method of claim 1, further comprising setting an inclusive mode to track a plurality of virtual addresses associated with the graphics context that are within an address range.

5. The method of claim 1, further comprising setting an exclusive mode to track a plurality of virtual addresses associated with the graphics context that are outside an address range.

6. The method of claim 1, further comprising setting a mode to enable virtual access tracking for the graphics context.

7. The method of claim 1, wherein a memory manager is configured to evict a physical page from a physical memory space based on values of the different virtual access bits included in the virtual access bit buffer.

8. The method of claim 1, wherein the page table entry matched to the virtual page resides in either a page table cache or a page table.

9. The method of claim 1, further comprising transmitting the physical address to a memory controller to access data stored in a physical memory space.

10. A graphics processing unit, comprising:
    memory management unit configured to:
       Initialize a virtual access bit buffer that includes a plurality of virtual access bits by clearing each virtual access bit in the plurality of virtual access bits, wherein the virtual access bit buffer includes a different virtual access bit for each virtual page residing within a virtual memory space allocated for a graphics context;
       receive a virtual address from a client conveying a memory access request associated with the graphics context,
       match a virtual page associated with the virtual address with a page table entry,
       derive a physical address from a physical page contained in the page table entry,
       determine that virtual access tracking is enabled, and
       set a virtual access bit located in the virtual access bit buffer, wherein the virtual access bit corresponds to the virtual page.

11. The graphics processing unit of claim 10, wherein the contents of the virtual bit buffer are duplicated in a virtual access bit cache.

12. The graphics processing unit of claim 11, wherein a physical address associated with the virtual access bit is used as a tag in the virtual access bit cache.

13. The graphics processing unit of claim 10, wherein an inclusive mode is set to track a plurality of virtual addresses associated with the graphics context that are within an address range.

14. The graphics processing unit of claim 10, wherein an exclusive mode is set to track a plurality of virtual addresses associated with the graphics context that are outside an address range.

15. The graphics processing unit of claim 10, wherein a mode is set to enable virtual access tracking for the graphics context.

16. The graphics processing unit of claim 10, wherein a memory manager is configured to evict a physical page from a physical memory space based on values of the different virtual access bits included in the virtual access bit buffer.

17. The graphics processing unit of claim 10, wherein the page table entry matched to the virtual page resides in either a page table cache or a page table.

18. The graphics processing unit of claim 10, further comprising transmitting the physical address to a memory controller to access data stored in a physical memory space.

19. A non-transitory computer-readable medium containing a sequence of instructions executable within a computing device including a processing unit and a memory system, wherein the sequence of instructions, when executed by the processing unit, causes the processing unit to:
    Initialize a virtual access bit buffer that includes a plurality of virtual access bits by clearing each virtual access bit in the plurality of virtual access bits, wherein the virtual access bit buffer includes a different virtual access bit for each virtual page residing within a virtual memory space allocated for a graphics context;
receive a virtual address from a client conveying a memory access request associated with the graphics context,
match a virtual page associated with the virtual address with a page table entry,
derive a physical address from a physical page contained in the page table entry,
determine that virtual access tracking is enabled, and
set a virtual access bit located in the virtual access bit buffer, wherein the virtual access bit corresponds to the virtual page.

20. The non-transitory computer-readable medium of claim 19, wherein a memory manager is configured to evict a physical page from a physical memory space based on values of the different virtual access bits included in the virtual access bit buffer.

21. The non-transitory computer-readable medium of claim 19, wherein an inclusive mode is set to track a plurality of virtual addresses associated with the graphics context that are within an address range.

22. The non-transitory computer-readable medium of claim 19, wherein an exclusive mode is set to track a plurality of virtual addresses associated with the graphics context that are outside an address range.

* * * * *